US009910720B2

(12) United States Patent
Karhunen (10) Patent No.: US 9,910,720 B2
(45) Date of Patent: Mar. 6, 2018

(54) METHOD AND APPARATUS FOR A MOBILE DEVICE BASED CLUSTER COMPUTING INFRASTRUCTURE

(71) Applicant: Huawei Technologies Co., Ltd., Shenzhen (CN)

(72) Inventor: Janne Karhunen, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/629,192

(22) Filed: Jun. 21, 2017

(65) Prior Publication Data
US 2017/0293762 A1 Oct. 12, 2017

Related U.S. Application Data

(63) Continuation of application No. PCT/CN2015/093237, filed on Oct. 29, 2015.

(30) Foreign Application Priority Data

Apr. 7, 2015 (EP) ..................................... 15162565

(51) Int. Cl.
*G06F 9/54* (2006.01)
*G06F 21/53* (2013.01)
(Continued)

(52) U.S. Cl.
CPC ............... *G06F 9/54* (2013.01); *G06F 9/466* (2013.01); *G06F 21/53* (2013.01); *H04L 41/0893* (2013.01); *G06F 2209/549* (2013.01)

(58) Field of Classification Search
CPC ...... G06F 9/5072; G06F 3/067; G06F 11/301; G06F 9/466; H04L 41/0893
See application file for complete search history.

(56) References Cited

U.S. PATENT DOCUMENTS 9,143,530 B2 * 9/2015 Qureshi .................. H04L 63/20
2004/0098447 A1 * 5/2004 Verbeke ............... G06F 9/5055
709/201

(Continued)

FOREIGN PATENT DOCUMENTS

CN 103685563 A 3/2014
CN 104010045 A 8/2014
(Continued)

OTHER PUBLICATIONS

Machine Translation and Abstract of Chinese Publication No. CN103685563, dated Mar. 26, 2014, 11 pages.
(Continued)

*Primary Examiner* — David Lazaro
(74) *Attorney, Agent, or Firm* — Conley Rose, P.C.

(57) ABSTRACT

A mobile computing apparatus including a processor coupled to a wireless communications interface, wherein the processor is configured to execute an init process, wherein the init process comprises a container manager. The processor creates, using the container manager, a plurality of secure containers and executes, in a first secure container of the plurality of secure containers, a first mobile device process. The processor executes, in a second secure container of the plurality of secure containers, a cluster node process, wherein the cluster node process is configured to operate as a node of a cloud service infrastructure.

13 Claims, 5 Drawing Sheets

(51) Int. Cl.
*G06F 9/46* (2006.01)
*H04L 12/24* (2006.01)

(56) References Cited

U.S. PATENT DOCUMENTS

| | | | |
|---|---|---|---|
| 2004/0160923 | A1 | 8/2004 | Nobukiyo et al. |
| 2005/0289264 | A1* | 12/2005 | Illowsky ............... G06F 1/3203 710/104 |
| 2006/0070067 | A1* | 3/2006 | Lowery ................ G06F 9/5027 718/100 |
| 2008/0214215 | A1* | 9/2008 | Aaltonen .......... G06F 17/30905 455/466 |
| 2008/0291876 | A1 | 11/2008 | Mukherjee et al. |
| 2010/0005410 | A1 | 1/2010 | Pang |
| 2014/0059226 | A1 | 2/2014 | Messerli et al. |
| 2014/0068611 | A1 | 3/2014 | McGrath et al. |
| 2014/0108649 | A1 | 4/2014 | Barton et al. |
| 2015/0095976 | A1 | 4/2015 | Osmond |
| 2017/0131987 | A1* | 5/2017 | Chen ......................... G06F 8/60 |

FOREIGN PATENT DOCUMENTS

| | | |
|---|---|---|
| TW | 200423608 A | 11/2004 |
| TW | 200849921 A | 12/2008 |
| TW | 201007563 A | 2/2010 |

OTHER PUBLICATIONS

Machine Translation and Abstract of Chinese Publication No. CN104010045, dated Aug. 27, 2014, 7 pages.

Coronato, A., et al., "Dynamic Distribution and Execution of Tasks in Pervasive Grids," XP031064190, EUROMICRO, 15th International Conference on Parallel, Distributed and Network-Based Processing, 2007, 5 pages.

Andrus, J., et al., "Cells: A Virtual Mobile Smartphone Architecture," Proceedings of the 23rd ACM Symposium on Operating Systems Principles, Oct. 23-26, 2011, 15 pages.

Foreign Communication From a Counterpart Application, European Application No. 15162565.4, Extended European Search Report dated Oct. 30, 2015, 9 pages.

Foreign Communication From a Counterpart Application, Taiwanese Application No. 10521501240, Taiwanese Office Action dated Dec. 6, 2016, 4 pages.

Foreign Communication From a Counterpart Application, European Application No. 15162565.4, European Office Action dated Jun. 7, 2017, 8 pages.

Foreign Communication From a Counterpart Application, PCT Application No. PCT/CN2015/093237, International Search Report dated Jan. 14, 2016, 4 pages.

\* cited by examiner

METHOD AND APPARATUS FOR A MOBILE DEVICE BASED CLUSTER COMPUTING INFRASTRUCTURE

CROSS-REFERENCE TO RELATED APPLICATIONS

This application is a continuation of International Application No. PCT/CN2015/093237, filed on Oct. 29, 2015, which claims priority to Europe Patent Application No. EP15162565.4, filed on Apr. 7, 2015. The disclosures of the aforementioned applications are hereby incorporated by reference in their entireties.

TECHNICAL FIELD

The aspects of the present disclosure relate generally to wireless communication systems and in particular to configuring mobile computing devices to form a cluster of computing resources.

BACKGROUND

Conventional large-scale computing systems rely on powerful clusters of thousands of central processing unit (CPU) cores. For example a Cray XK7 located at the Oak Ridge National Laboratory in the United States uses 560,640 Opteron cores to provide about 17590 tera-floating point operations per second (TFlops) with each Opteron 6274 core providing 282 giga-floating point operations per second (GFlops). The Cray XK7 just described costs about 100 million United States dollars, requires a large space to install, consumes significant power, and requires constant costly maintenance. Because of the high cost and resource requirements associated with operating these large-scale computing systems few enterprises can afford to purchase and operate them.

As the preferred computing platform of users' shifts from desktop and traditional laptop computers toward mobile devices such as smartphone, phablets, and tablet devices, the number of available mobile computing devices has increased dramatically. By some estimates there are over a billion smartphones available worldwide, many of which may be accessed via a common network infrastructure. Most of these mobile computing devices are equipped with processing cores based on the instruction sets and architectures developed by ARM Holdings Incorporated such as the popular Cortex core. Most of these mobile computing devices run Linux based operating systems. A single Cortex A15 core can provide about 100 GFlops, and three Cortex A15 cores provide a computational capability comparable to a single Opteron 6274 core. For example, using 1.7 million mobile devices, assuming each mobile device contains at least one Cortex A15 core, a cluster can be formed with computing power on par with some of the largest super computers in the world.

Using the spare computing power of mobile devices presents a number of challenges. Mobile computing devices such as cell phones and tablets have access to sensitive personal and business related information. Use of spare computing resources on these devices will therefore require strong and reliable security. Users of cell phones or other mobile computing devices do not tolerate data latency or slow response times. Therefore response times and latency in mobile computing devices, especially in phone or other user centric applications, must be kept low.

Cloud based computing is a recently evolving metaphor for providing computing services and/or resources using a group of remotely deployed computing resources communicating over a common wide area network. As used herein the term cloud service infrastructure refers to a collection of remotely deployed computing resources communicating over a common network such that any portion or all of the resources can be coordinated to solve a common computing problem or execute a coordinated set of computing tasks. A cloud service infrastructure may be viewed as a type of computing cluster where the individual computing resources or cluster nodes are distributed, communicate over a wide area network, and may execute related but not necessarily the same computing task.

Cluster technologies such as the Linux Containers (LXC) developed by a consortium of software corporations, Docker an open source container technology designed for the Windows operating system, and Rocket a standards based application container technology, have been widely deployed on servers in computing data centers. These technologies allow applications to be executed in isolated environments for security purposes, and ease the deployment of applications on heterogeneous hardware infrastructures.

Container technologies for embedded devices, such as mobile computing devices, are currently being studied and introduced. Some early examples include KNOX being developed by Samsung Corporation, and McAfee Secure Container for Android being developed by a subsidiary of the Intel Corporation. These container implementations require that the same operating system be used in all containers on a device, and certain applications are configured such that they can only be run in a container. In these implementations, data isolation is provided by the containers, so the data belongs to the application running inside a container and cannot be accessed by any other application running outside the container or in another container. The application, running inside a container, also cannot access data of any other application.

An alternative solution has been proposed based on a type of virtualization. This solution allows multiple different operating systems to be run on the same embedded device by running several containers each having its own operating system. These containers are created by a root namespace which also runs services, such as wireless access service, that can be accessed simultaneously by the various operating systems running in the containers. There have been other attempts at building clusters of embedded devices however, these approaches did not use container-like technologies for data isolation.

Thus there is a need for improved methods and apparatus for creating and managing resources of secure containers on mobile computing devices and for methods and apparatus for creating a cloud service infrastructure based on the spare computing resources of a population of mobile computing devices.

SUMMARY

It is an object of the present disclosure to provide apparatus and methods for incorporating mobile computing devices in a cloud service infrastructure. A further object of the present disclosure is to provide methods and apparatus for securely accessing the idle computing power of a mobile computing apparatus.

According to a first aspect of the present disclosure the above and further objects and advantages are obtained by a mobile computing apparatus including a processor. The processor is configured to execute an init process, wherein the init process includes a container manager. The processor creates, using the container manager, a plurality of secure containers and executes, in a first secure container of the plurality of secure containers, a first mobile device process. The processor is configured to execute, in a second secure container of the plurality of secure containers, a cluster node process, wherein the cluster node process is configured to operate as a node of a cloud service infrastructure.

In a first possible implementation form of the mobile computing apparatus according to the first aspect idle computing power of the mobile computing device may be made available to a cluster computing infrastructure by the mobile computing apparatus further comprises a wireless communications interface coupled to the processor and the processor is configured to, while executing the cluster node process, receive a task request from the wireless communications interface; pass the task request to the init process; receive a task result from the init process; and transmit the task result over the wireless communication interface.

In a second possible implementation form of the mobile computing apparatus according to the first aspect as such or according to the first implementation form of the first aspect, computing tasks for a cluster computing infrastructure may be executed by the processor where while executing the init process the processor is configured to create a task container corresponding to the task request, download a task environment corresponding to the task request, execute a task within the task container, and send a task result to the second secure container.

In a third possible implementation form of the mobile computing apparatus according to the first aspect as such or according to any of the preceding implementation forms, the mobile computing apparatus comprises a wireless communications interface coupled to the processor and a cluster computing infrastructure is given control of an executing task by configuring the processor to, while executing the cluster node process, receive a task lifecycle command from the wireless communications interface and send the received task lifecycle command to the init process, and while executing the init process, modify a state of the task container based on the task lifecycle command, wherein the task lifecycle command is one of a start command, a stop command, a pause command, a resume command, and a cancel command.

In a fourth possible implementation form of the mobile computing apparatus according to the first aspect as such or according to any of the preceding implementation forms of the first aspect, secure communication among the secure containers may be provided by an apparatus wherein the init process comprises a virtual bridge, and the processor is configured to communicatively couple each of the secure containers in the plurality of secure containers with the virtual bridge, and control communication between pairs of secure containers in the plurality of secure containers based on a pre-determined filter criteria.

In a fifth possible implementation form of the mobile computing apparatus according to the fourth possible implementation form of the first aspect the processor is configured to allow communication between a secure container in the plurality of secure containers and the init process and to prevent direct (without the init process in-between) communication between secure containers in the plurality of secure containers.

In a sixth possible implementation form of the mobile computing apparatus according to the first aspect as such or according to any of the preceding implementation forms, the mobile computing apparatus optimizes utilization of available computing resources with the processor configured to, while executing the init process, allocates resources to each secure container in the plurality of secure containers based on a heuristic.

In a seventh possible implementation form of the mobile computing apparatus according to the first aspect as such or according to any of the preceding implementation forms, a user is provided with multiple mobile devices on a single physical computing apparatus by having the processor configured to execute, in a third secure container in the plurality of secure containers, a second mobile device process.

In an eighth possible implementation form of the mobile computing apparatus according to the seventh possible implementation form of the first aspect as such, the mobile computing apparatus allows separate control of security policies for each mobile device processes by having the processor configured to enforce a less restrictive security policy on the first mobile device process than is enforced on the second mobile device process.

In a ninth possible implementation form of the mobile computing apparatus according to the first aspect as such or according to any of the preceding implementation forms the processor is configured to create a secure container based on a configuration file wherein the configuration file is accessible only by the init process, specifies the startup status of the container, and specifies resource quotas for the container.

In a tenth possible implementation form of the mobile computing apparatus according to the first aspect as such or according to any of the preceding implementation forms, the mobile computing apparatus ensures the user is presented with a desirable user experience by having the processor configured to activate one of the first and second mobile device processes; and provide the currently active mobile device process priority access to all resources of the mobile computing apparatus.

In an eleventh possible implementation form of the mobile computing apparatus according to the first aspect as such or according to any of the preceding implementation forms, the mobile computing apparatus prevents the cluster infrastructure from interfering with the user experience of a user of the mobile computing apparatus with a mobile computing apparatus that further comprises a user interface and the processor is configured to prevent the cluster process from accessing the user interface.

In a twelfth possible implementation form of the mobile computing apparatus according to the first aspect as such or to any of the preceding implementation forms, the mobile computing apparatus provides improved flexibility and functionality to a cluster computing infrastructure by having each of the secure containers in the plurality of secure containers comprises a different operating system.

According to a second aspect of the present disclosure the above and further objects and advantages are obtained by a method for a mobile computing device. The method includes executing an init process, wherein the init process comprises a container manager; creating, using the container manager, a plurality of secure containers; executing, in a first secure container of the plurality of secure containers, a first mobile device process; and executing, in a second secure container of the plurality of secure containers, a cluster node process, wherein the cluster node process is configured to operate as a node of a cloud service infrastructure.

According to a third aspect of the present disclosure the above and further objects and advantages are obtained by a computer program comprising non-transitory computer program instructions that when executed by a processor cause the processor to perform the method according to the second aspect.

These and other aspects, implementation forms, and advantages of the various embodiments will become apparent from the embodiments described herein considered in conjunction with the accompanying drawings. It is to be understood, however, that the description and drawings are designed solely for purposes of illustration and not as a definition of the limits of the disclosed disclosure, for which reference should be made to the appended claims. Additional aspects and advantages of the disclosure will be set forth in the description that follows, and in part will be obvious from the description, or may be learned by practice of the disclosure. Moreover, the aspects and advantages of the disclosure may be realized and obtained by means of the instrumentalities and combinations particularly pointed out in the appended claims.

BRIEF DESCRIPTION OF THE DRAWINGS

In the following detailed portion of the present disclosure, the disclosure will be explained in more detail with reference to the example embodiments shown in the drawings, in which.

DETAILED DESCRIPTION OF THE DISCLOSED EMBODIMENTS

Figure 1:
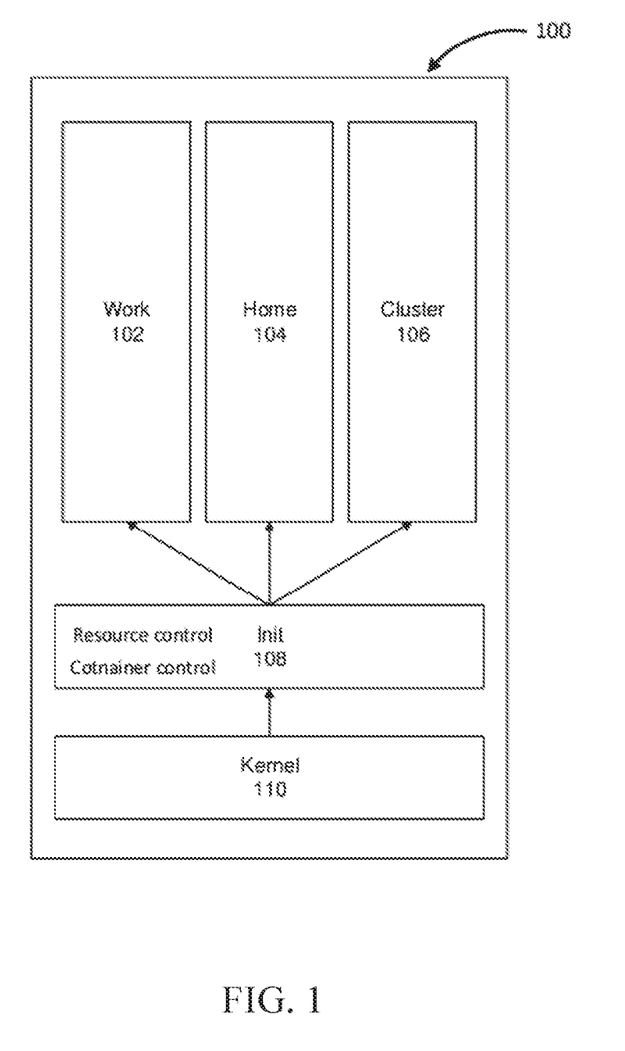
FIG. 1 illustrates a block diagram of a mobile computing device showing an embodiment for deploying a cluster node process incorporating aspects of disclosed embodiments.

FIG. 1 illustrates a block diagram of a mobile computing device 100 showing an embodiment for deploying a cluster node process. The mobile computing device includes within its software architecture a plurality of secure containers 102, 104, 106 and the secure containers 102, 104, 106 are managed by a central control process 108 referred to herein as init. Each secure container 102, 104, 106 provides an isolated execution environment or process space in which an application, such as a mobile device application, may be safely run. Thus a container may also be referred to herein as a process. The mobile computing device 100 includes one init process 108 which is the first entity started after the operating system (OS) kernel 110 starts up. The init process 108 may run in its own container or may run directly as a process within the OS space.

When the init process 108 is run in a container the container should have appropriate privileges to allow management of all containers and allocation of all computing resources of the mobile computing device 100. The init process 108 is responsible for managing all other processes running on the mobile computing device 100. Init 108 is also responsible for controlling how a process runs, which means it manages the resources used by each process and controls security privileges of each process. Management of resources refers to controlling computing resources such as allocating the amount of available processing time a process can use, the amount of memory consumed, and whether a process can access the user interface, access the file system, etc. The security privileges, which may also be referred to as permissions or restrictions, refer to controlling, i.e. allowing or restricting, access to services, resources, or other processes running on the device.

In certain embodiments the init process 108 creates three separate secure containers 102, 104, 106 and starts a mobile device process configured for home use in a home container 104, a mobile device process configured for work use in a work container 102, and a cluster node process 106 in a third secure container. Throughout this description the terms secure container and process may be used interchangeably to refer to a particular secure container or to the process running in that secure container and the meaning will be clear from the context in which the term is used.

The work container or work process 102 may be used to access a corporate or business network. Since corporate or business networks often have access to sensitive and valuable information the work container 102 may be configured to have the strictest or most restrictive security policy or security controls. For example, the work container 102 allows a user to access their company emails, documents, and work contact lists. The work container 102 needs to remain safe and clean, i.e. free from viruses or spyware type programs typically picked up from unrestricted internet activities.

The home container 104 may have less restrictive security policies which allow a user to perform higher risk activities such as surfing the interact, downloading and executing applications, or playing games. Providing two separate mobile device containers eliminates the need for carrying multiple cell phones, one for work and one for personal or home use.

The init process 108, which may be referred to as a root namespace, provides a number of new functionalities not provided by conventional root processes. The init process 108 has the ability to start and stop each container and can configure multiple containers to run simultaneously. The init process 108 is also configured to pause and resume any of the secure containers it has created. The commands start, pause, resume, stop, and cancel, etc. are used to control the lifecycle of a secure container and the processes running inside the container and may be referred to as lifecycle commands.

The init process 108 also configures the resources each secure container 102, 104, 106 will have available during the active portions, i.e. while the container is in a running state of its lifecycle. The init process 108 can obtain the resource requirements from a configuration file, from an external task request that triggers creation of the container, or the resources may be configured automatically based on any of various artificial intelligence (AI) algorithms. These AI algorithms are referred to herein as heuristics. The resources allocated to each secure container 102, 104, 106 will include the amount of processing power or CPU time, an amount of memory, as well as other resources. The resources allocated to each secure container 102, 104, 106 are determined in a fashion that efficiently utilizes the idle computing power of the mobile computing device 100 while also guaranteeing that the user of the mobile computing device 108 retains the highest priority access to the resources of the mobile computing device. It is important to ensure that the experience of user of the mobile computing device 100 is not adversely affected by other processes sharing the resources of the mobile computing device 100.

The cluster node process 106 is configured to act as a node of a cluster or cloud service infrastructure. To do this the cluster node negotiates use of idle computing power, i.e. computing power not required to support the user experience provided by the mobile computing device 100, for execution of computing tasks provided by an external cloud service (not shown). To avoid adversely affecting the user's experience the cluster node process 106 is configured to run in the background. A background process or a process running in the background refers to a process that is run at a lower priority than the foreground processes and does not access the user interface. Thus, a background process is substantially invisible to a user of the mobile computing device and does not adversely affect a user's experience.

A container, or secure container as referred to herein, is a form of operating system virtualization used to create an isolated user space instance. Each container is given, by the OS kernel or an init process 108, a set of namespace features which form an isolated set of computing resources in which an application or process may be executed. With the data isolation of conventional containers, which may also be referred to as jails, the data belongs to applications running inside a container and cannot be accessed by an application running in another container or an application running in a different container. This isolation allows potentially harmful applications to be run in a safe and secure manner without the possibility of corrupting the operating system or other containers. Secure containers created by the init process 108 may each contain different operating systems, such as different Linux distributions, and may therefore be viewed as a form of operating system virtualization.

In conventional operating systems the OS kernel creates a root namespace to provide functionality such as container management, resource allocation etc. In the embodiments disclosed herein the init process 108 is started as the first or root namespace. The init process 108 may be created directly, or alternatively, it may itself be hosted within a container. As compared to conventional root namespaces, the init process 108 provides a variety of additional advantageous functionality.

The init process 108 controls the lifecycle of the secure containers 102, 104, 106 it has created and can start and stop a container and can run multiple containers at a time. The init process 108 can also pause and resume any of the secure containers 102, 104, 106 running on the mobile computing device 100.

When starting a secure container, the init process 108 configures the computing resources, such as memory, processing time, etc., to be used by the secure container or process. Computing resources to be allocated to a cluster container 106 are determined to achieve full utilization of the idle computing power of the mobile computing device 100 while also guaranteeing that the user of the mobile computing device 100 receives priority access to all resources needed to avoid adversely affecting the user experience. As described above the resources allocated to a secure container can be determined automatically based on an AI algorithm or heuristic or alternatively the resources may be configured based on configuration files.

Container creation is based on a predetermined default configuration. The default configuration provides general information about container creation such as how many secure containers may be created on the mobile computing device 100 and default resource configuration for a secure container. Additional information for each secure container may also be provided in an additional configuration file which provides information specific to the particular secure container. The init process 108 may create secure containers based on information in the configuration files.

Configuration files may be stored in a computer memory accessible by the init process 108 and are well formed. Each configuration file may contain a name to be used for the corresponding secure container and specifies the root file system image and the mounting point of that image. Resource quotas, such as the amount of memory and processor time allocated to the container, are also provided in the configuration files. Alternatively, resource quotas may be found using a combination of configuration file information and heuristics. Configuration files may also provide a startup status for the corresponding secure container such as whether to start the container by default, or start it on demand. A start by default container is started automatically when the mobile computing device 100 is started, while a start on demand startup status specifies a container that should be started only after the init process 108 receives an appropriate request. Configuration files are stored in the root or default namespace and can only be modified by the init process 108.

Secure containers can be configured such that they do not start up automatically. A user or other authorized entity may change the configuration of a secure container by sending a request to the init process 108. Once permission is authenticated, the init process 108 will modify the secure container configuration accordingly and the modification will take effect the next time the secure container is started. In certain embodiments there is only one process in each secure container that is authorized to send requests to the init process 108.

The secure containers 102, 104, 106 running on the mobile computing device 100 run in isolated process spaces and are not allowed to communicate with each other. Communication between the secure containers 102, 104, 106 is provided by a virtual bridge created during startup of the mobile computing device 100. When a secure container is created a pair of network sockets is also created, one network socket is bound to the newly created secure container and the other network socket is bound to the virtual bridge thereby creating a communication path between the secure container and the virtual bridge. In certain embodiments the virtual bridge may communicate using the internet protocol (IP) and a range of IP addresses is assigned to the virtual bridge when it is started. Network sockets based on the internet protocol may be referred to as internet sockets. The virtual bridge allows a process running in a secure container to communicate with the host operating system or with other processes running in a different secure container.

For security purposes it is desirable in certain embodiments to incorporate a filter module with the virtual bridge. The filter module may be configured to prevent direct communication between secure containers and to allow communication only between secure containers 102, 104, 106, and the init process 108. Note that in certain embodiments the init process 108 may also be running in a secure container and in these embodiments the filter module is configured to allow communication only between container of the init process 108 and other secure containers.

Figure 2:
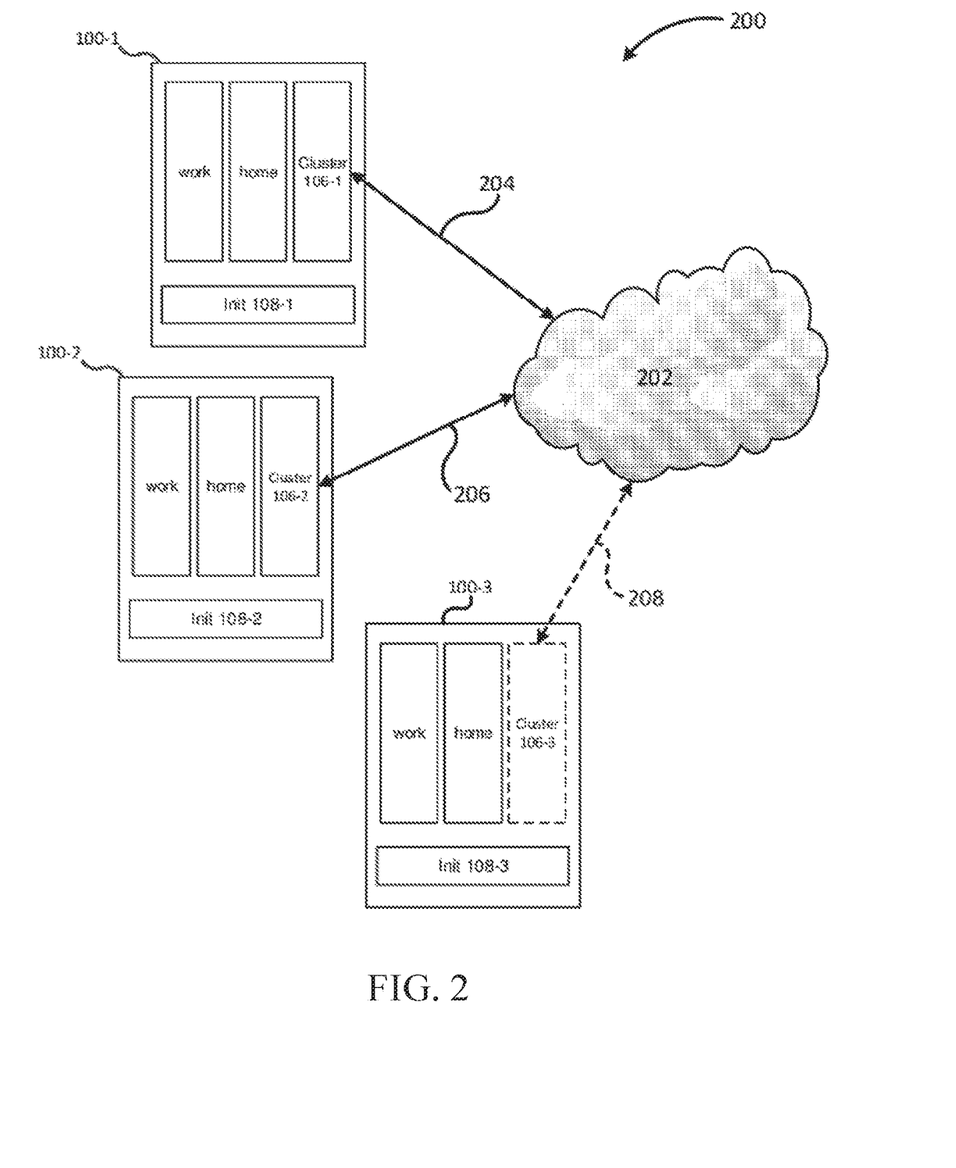
FIG. 2 illustrates a pictorial diagram depicting an embodiment of a cloud service infrastructure incorporating aspects of the disclosed embodiments.

FIG. 2 illustrates a pictorial diagram depicting how mobile computing devices 100-1, 100-2, 100-3, such as the mobile computing device 100 described above, could participate with a cloud service 202 as cluster nodes in a cloud service infrastructure, generally indicated by numeral 200.

Only three mobile computing devices 100-1, 100-2, 100-3 are illustrated in FIG. 2, however since there are a large number of mobile computing devices in use, the cloud service infrastructure 200 may include multiple millions of mobile computing devices to form a large distributed cluster. Thus, the cloud service infrastructure 200 may be used to provide large-scale computing capabilities by leveraging the idle computing power of many millions of mobile computing devices 100-1, 100-2, 100-3.

Each mobile computing device 100-1, 100-2, 100-3 is configured to create a cluster container 106-1, 106-2, 106-3 and run a cluster node process within the cluster container 106-1, 106-2, 106-3. Each cluster container 106-1, 106-2, 106-3 will establish communications over communication links 204, 206, 208 with the cloud service 202 and join the cluster.

When a mobile computing device 100-3 is busy servicing user requests the cluster container 106-3 may temporarily stop accepting requests from the cloud service 202 as illustrated by the dashed lines used for the cluster node 106-3 and communication link 208. By, temporarily pausing the cluster node process a mobile device 100-3 can avoid adversely impacting the user experience of a person using the mobile computing device 100-3.

Each mobile computing device 100-1, 100-2, 100-3 is configured so that the init process 108-1, 108-2, 108-3 running on the respective computing device 100-1, 100-2, 100-3 will create a cluster container 106-1, 106-2, 106-3 and run a cluster node process in the cluster container 106-1, 106-2, 106-3. When the mobile computing device such as mobile computing device 100-3 is busy with other user tasks its respective init process 108-3 may pause the cluster container 106-3, alternatively a user may decide to pause or completely disable the cluster container 106-3 when desired. By default the cluster container 106-1, 106-2, 106-3 does not access a graphical user interface and may not have any interaction with a user of the mobile computing device 100-1, 100-2, 100-3.

A cluster node process running in the cluster container 106-1, 106-2, 106-3 is responsible for getting tasks requests from the cloud service 202 and sending these task requests to the corresponding init process 108-1, 108-2, 108-3. The cluster process 106-1, 106-2, 106-3 is the only process or secure container that communicates with the cloud service 202. When the init process 108-1, 108-2, 108-3 receives a task request from the cluster process running in a cluster container 106-1, 106-2, 106-3, the init process 108-1, 108-2, 108-3 will download a task environment or task image from the cluster process based on a task description included with the task request and create a corresponding secure container for execution of the task. The task image may be based on a base image with one or more overlays as defined by the task description, where the image refers to the combination of the secure container created for a task and the software programs loaded into the secure container. When a task result is available from a running task, the init process 108-1, 108-2, 108-3 will send this result to the cluster node process running in the cluster container 106-1, 106-2, 106-3. The cluster node process running in the cluster container 106-1, 106-2, 106-3 then sends the result to the cloud service 202.

The cluster node process uses a pre-defined cloud protocol to communicate with the cloud service 202 over each communication link 204, 206, 208. This cloud protocol describes how to implement a handshake mechanism between each cluster node process and the cloud service infrastructure 202 to ensure reliable message delivery. The cloud protocol includes messages to allow the cloud service infrastructure 202 to manage tasks running on a mobile computing device 100-1, 100-2, 100-3. Task management may include operations such as initializing a task environment, starting or dispatching a task, interrupting or pausing a task, stopping or hanging up a task, and cancelling a task before it is complete. The cloud protocol may also include a message for returning a task result to the cloud service infrastructure 202. The cloud protocol allows the cloud computing infrastructure 200 to manage tasks running on mobile computing devices that have joined the cloud and to send data to and receive data from tasks running on each node.

Figure 3:
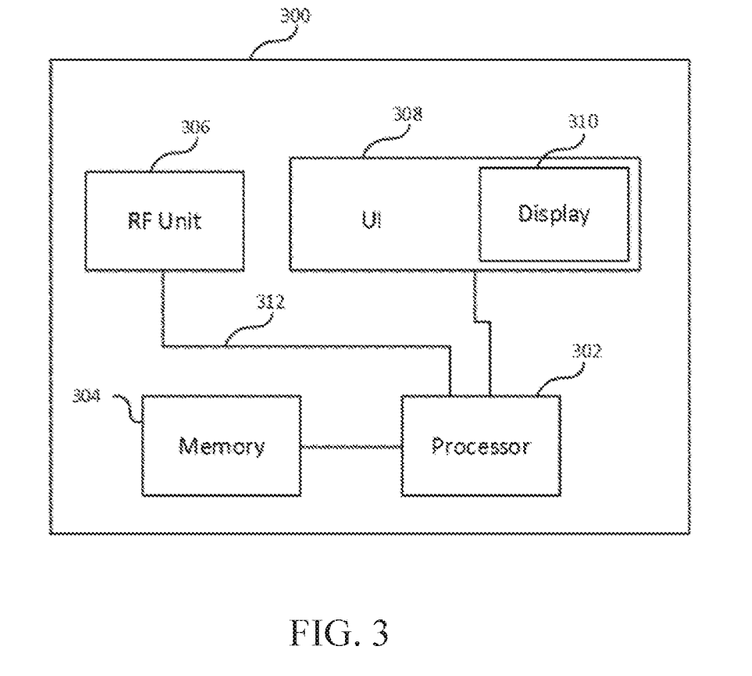
FIG. 3 illustrates a block diagram of a mobile computing device appropriate for implementing embodiments of the present disclosure.

FIG. 3 illustrates a block diagram of a mobile computing device 300 appropriate for implementing embodiments of the present disclosure. The illustrated mobile computing device 300 includes a processor 302 coupled to a computer memory 304, a radio frequency (RF) unit 306, a user interface (UI) 308 and a display 310. The apparatus 300 is appropriate for use as a mobile computing device, which may be any of various types of wireless communications user equipment including cell phones, smart phones and tablet devices.

The processor 302 may be a single processing device or may comprise a plurality of processing devices including special purpose devices, such as for example, digital signal processing (DSP) devices, microprocessors, specialized processing devices or general purpose computer processors. The processor 302 is configured to perform the processes described herein. The processor often includes a CPU working in tandem with a graphics processing unit (GPU) and includes a DSP to handle signal processing tasks. In certain embodiments the processor 302 includes one or more, often four, cores such as the ARM Cortex cores.

The processor 302 is coupled 312 to a memory 304 which may be a combination of various types of volatile and non-volatile computer memory such as for example read only memory (ROM), random access memory (RAM), magnetic or optical disk, or other types of computer memory. The memory 304 stores computer program instructions that may be accessed and executed by the processor 302 to cause the processor to perform a variety of desirable computer implemented processes or methods such as cluster computing methods described herein.

The program instructions stored in memory 304 are organized as sets or groups of program instructions referred to in the industry with various terms such as programs, software components, software modules, units, etc. Each module may include a set of functionality designed to support a certain purpose. For example a software module may be of a recognized type such as an operating system, an application, a device driver, or other conventionally recognized type of software component. Also included in the memory 304 are program data and data files which are stored and processed by the computer program instructions.

The RF Unit 306 is coupled to the processor 302 and configured to transmit and receive RF signals based on digital data 312 exchanged with the processor 302. The RF Unit 306 is configured to transmit and receive radio signals that may conform to one or more of the wireless communication standards in use today, such as for example Long Term Evolution (LTE) and LTE-Advanced (LTE-A) developed by the third generation partnership project (3GPP), based on the institute of electrical and electronics engineers (IEEE) 802.11 standards, as well as many others. In certain embodiments, the RF Unit 306 includes receivers capable of receiving and interpreting messages sent from satellites in the global positioning system (GPS) and work together with information received from other transmitters to obtain positioning information pertaining to the location of the device 300.

The UI 308 may include one or more user interface elements such as a touch screen, keypad, buttons, voice command processor, as well as other elements adapted for exchanging information with a user. The UI 308 may also include a display unit 310 configured to display a variety of information appropriate for a mobile computing device or mobile user equipment and may be implemented using any appropriate display type such as for example organic light emitting diodes (OLED), liquid crystal display (LCD), as well as less complex elements such as LEDs or indicator lamps. In certain embodiments the display unit 310 incorporates a touch screen for receiving information from the user of the mobile computing device 100.

Figure 4:
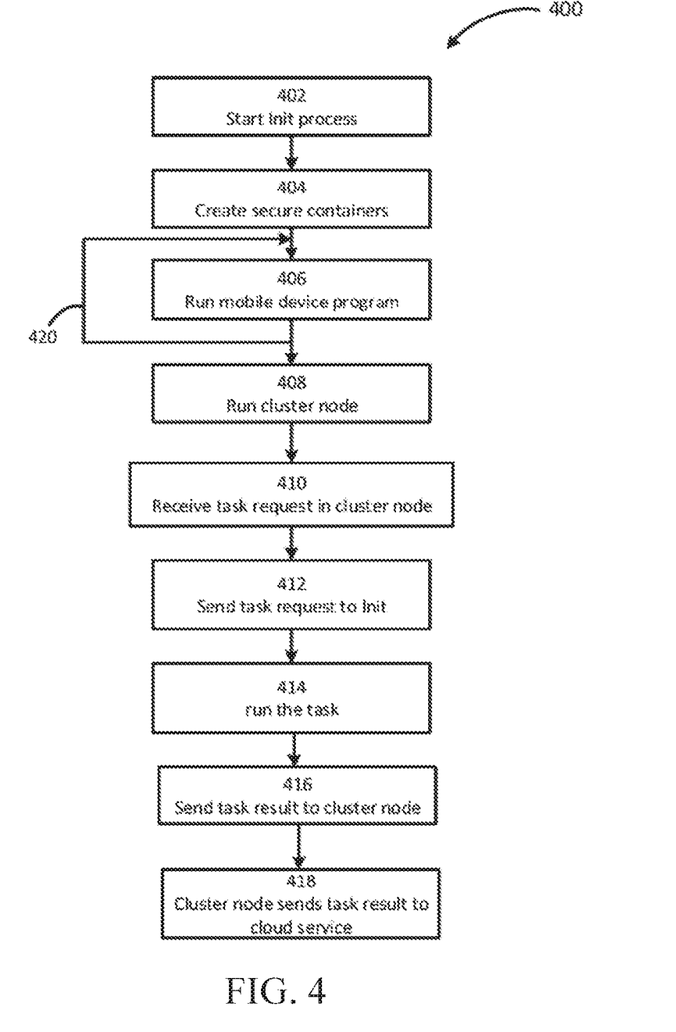
FIG. 4 illustrates a flow chart of an method for using mobile computing devices as nodes in a cloud or cluster computing infrastructure incorporating aspect of the present embodiments.

FIG. 4 illustrates a flow chart of an method 400 for using mobile computing devices as nodes in a cloud or cluster computing infrastructure, which can be performed by an apparatus (e.g. a processor of the apparatus) according to an embodiment of the present disclosure. A mobile computing device such as the mobile computing device described above with reference to FIG. 1 and FIG. 3, can implement the method 400 to provide its idle computing resources for use by a cloud service. When a mobile computing device 100 is initially turned on it starts 402 an init process, such as the init process 108, during its initialization procedure. The init process 108, among other things, manages secure containers running on the mobile computing device 100. The init process 108 is capable of creating and assigning resources to secure containers 102, 104, 106, as well as managing the lifecycle of each secure container and managing communications, via a virtual bridge, with the secure container.

The init process 108 will then create 404 one or more secure containers 102, 104, 106 based on configuration files stored in memory on the mobile computing device 100. Alternatively the secure containers 102, 104, 106 may be created based on heuristics or other AI algorithms or may be created based on a combination of configuration files and AI algorithms. The init process 108 then runs 406 a mobile device program in one of the secure containers 102, 104, 106.

As used herein the term mobile device application or mobile device process refers to a smart phone such as an Android based smartphone, a tablet computer, or other type of mobile application. The mobile device program includes its own operating system and system services as well as the user applications associated with conventional mobile user equipment.

In certain embodiments it is advantageous to repeat 420 the step of running a mobile device 406 and run multiple mobile device programs in separate processes or containers, such as the work container 102 and home container 104 described above. Creating multiple secure containers running multiple mobile device programs is done when it is desired to have a single mobile computing device operate as multiple separate smartphones for example to eliminate the need for carrying both a work mobile phone and a personal mobile phone. The init process 108 creates a separate secure container for the cluster node process and runs 408 a cluster node process in the secure container. The cluster node process or container, such as the cluster node container 106 described above, establishes communications with a cloud service 202 using a protocol such as the cloud protocol described above to make its idle computing power available for use by the cloud service infrastructure 200. In certain embodiments it is desirable to allow the cluster node process to be disabled or otherwise controlled by a user of the mobile computing device 100 or by a wireless communication network to which the mobile computing device 100 is connected.

When a task needs to be executed by the cloud service it will send a task request to the mobile computing device 100. The task request is received 410 by the cluster node process running in a secure container on the mobile computing device 100, and the cluster node process then sends 412 the task request to the init process 108 and runs the task 414. As will be described in more detail below, running the task 414 is accomplished by creating a secure container based on information contained in the task request, loading the task environment into the secure container, and controlling execution of the task.

Once the task is complete, or whenever a task result is available, the init process 108 sends 416 the task result to the cluster node process and the cluster node process sends 418 the task result to the cloud service. At any time during execution of a task, the cluster node process may receive a task request asking that the task be cancelled. When this occurs, the cluster node process will forward the cancellation or other task request to the init process 108 and the init process 108 will take appropriate action, such as in the case of a cancellation request, halt the task and recover the computing resources.

Figure 5:
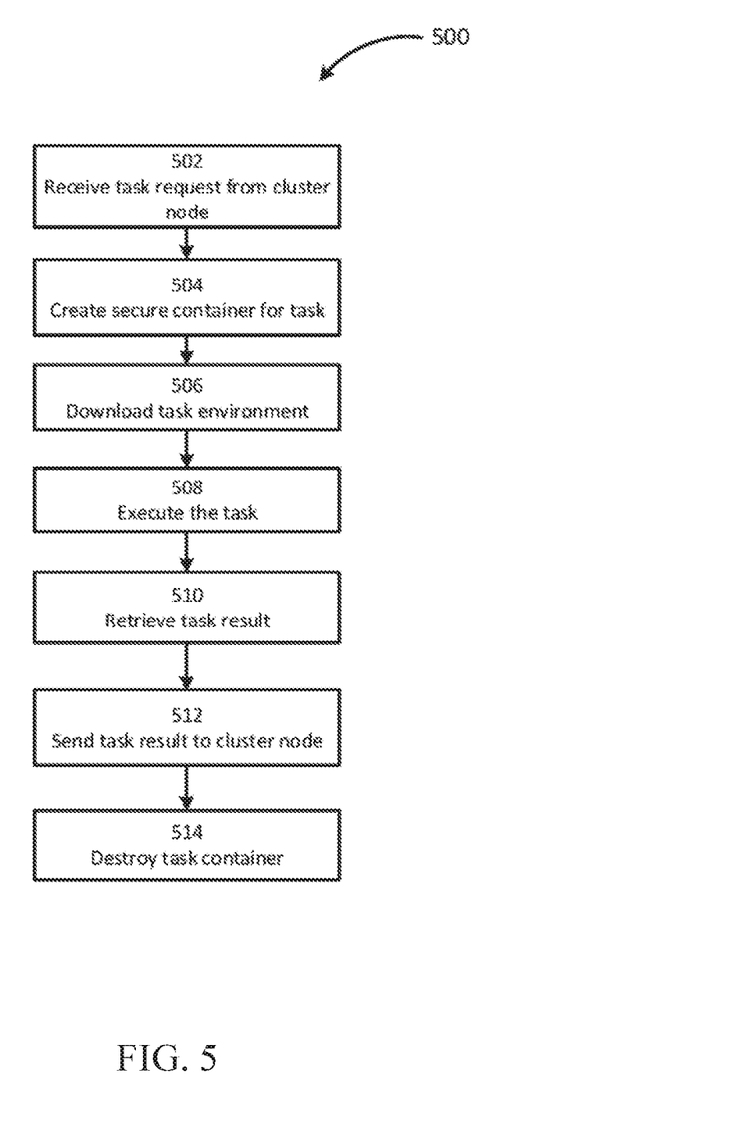
FIG. 5 illustrates a flow chart of an embodiment of a method for executing tasks in a cloud service infrastructure incorporating aspects of the disclosed embodiments.

FIG. 5 illustrates a flow chart of an embodiment of a method 500 as may be used by the init process 108 to run a task, which can be performed by an apparatus (e.g. by a processor of the apparatus) according to an embodiment of the present disclosure. The method begins when the init process, such as the init process 108 described above, receives 502 a task request from a cluster node process running in a secure container 106 within the mobile computing device 100. The init process creates 504 a secure container for execution of the task based on a task description contained in the task request and allocates appropriate resources to the secure container for execution of the task. A secure container created and prepared for running a task is referred to herein as a task container. Resource allocation for the task container may also be based on heuristics or pre-determined algorithms configured to prevent execution of the task from interfering with execution of any mobile device processes running on the mobile computing device.

The init process 108 downloads 506 the task environment and otherwise prepares the task container for execution of the task, then executes 508 the task within the task container. During execution 508 of the task the init process 108 manages the lifecycle of the task container and manages execution of the task to ensure proper completion of the task and ensures that execution of the task does not interfere with the user experience of the mobile computing device 100. When execution of the task completes, or at intervals during execution of the task, the init process 108 receives 510 task results from the running task. These task results are sent 512 to the cluster node process where they may be forwarded on to a cloud service. Once the task completes, the init process destroys 514 the task container and recovers any computing resources for use by other containers or processes running on the mobile computing device.

The cloud service infrastructure along with the methods and apparatus described herein may be advantageously employed to provide a variety of useful services. For example the apparatus and methods for providing a cloud service infrastructure may be used to provide services for the mobile computing devices such as data synchronization between mobile computing devices and a cloud service infrastructure, mobile computing device data backup, software installation, an update for mobile computing devices, and controlling the state of a mobile device such as pausing and resuming phone features. The cloud service infrastructure may also be advantageously employed for collaborative computing or forming large-scale computer systems.

Thus, while there have been shown, described and pointed out, fundamental novel features of the disclosure as applied to the embodiments thereof, it will be understood that various omissions, substitutions and changes in the form and details of devices and methods illustrated, and in their operation, may be made by those skilled in the art without departing from the spirit and scope of the disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A mobile computing apparatus comprising:
 a processor configured to:
  execute an init process comprising a container manager and a virtual bridge;
  create, using the container manager, a plurality of secure containers;
  execute, in a first secure container of the plurality of secure containers, a first mobile device process;
  execute, in a second secure container of the plurality of secure containers, a cluster node process configured to operate as a node of a cloud service infrastructure;
  communicatively couple each of the secure containers in the plurality of secure containers with the virtual bridge;
  control communication between pairs of secure containers in the plurality of secure containers based on a pre-determined filter criteria;
  allow communication between at least one of the secure containers in the plurality of secure containers and the init process; and
  prevent direct communication between secure containers in the plurality of secure containers.

2. The mobile computing apparatus of claim 1, wherein the mobile computing apparatus further comprises a wireless communications interface coupled to the processor, and wherein the processor is further configured to:
 receive a task request from the wireless communications interface;
 send the task request to the init process;
 receive a task result from the init process; and
 transmit the task result over the wireless communication interface.

3. The mobile computing apparatus of claim 2, wherein the processor is further configured to:
 create a task container corresponding to the task request;
 download a task environment corresponding to the task request;
 execute a task within the task container; and
 send a task result to the second secure container.

4. The mobile computing apparatus of claim 3, wherein the processor is further configured to:

receive a task lifecycle command from the wireless communications interface;
 send the received task lifecycle command to the init process; and
 modify a state of the task container based on the task lifecycle command, wherein the task lifecycle command is one of: a start command, stop command, pause command, resume command, and cancel command.

5. The mobile computing apparatus of claim 1, wherein the processor is further configured to allocate resources to each secure container in the plurality of secure containers based on a heuristic.

6. The mobile computing apparatus of claim 1, wherein the processor is further configured to execute, in a third secure container in the plurality of secure containers, a second mobile device process.

7. The mobile computing apparatus of claim 6, wherein the processor is further configured to enforce a less restrictive security policy on the first mobile device process relative to the second mobile device process.

8. The mobile computing apparatus of claim 1, wherein the processor is further configured to create secure containers based on a configuration file wherein the configuration file:
 is accessible only by the init process;
 specifies the startup status of the container; and
 specifies resource quotas for the container.

9. The mobile computing apparatus of claim 1, wherein the processor is further configured to:
 activate one of the first and second mobile device processes; and
 provide a currently active mobile device process priority access to all resources of the mobile computing apparatus.

10. The mobile computing apparatus of claim 1, further comprising a user interface, wherein the processor is further configured to prevent the cluster node process from accessing the user interface.

11. The mobile computing apparatus of claim 1, wherein each of the secure containers in the plurality of secure containers comprises a different operating system.

12. A method for a mobile computing device, the method comprising:
 executing an init process, wherein the init process comprises a container manager and a virtual bridge;
 creating, using the container manager, a plurality of secure containers;
 executing, in a first secure container of the plurality of secure containers, a first mobile device process;
 executing, in a second secure container of the plurality of secure containers, a cluster node process, wherein the cluster node process is configured to operate as a node of a cloud service infrastructure;
 communicatively coupling each of the secure containers in the plurality of secure containers with the virtual bridge;
 controlling communication between pairs of secure containers in the plurality of secure containers based on a pre-determined filter criteria;
 allowing communication between at least one of the secure containers in the plurality of secure containers and the init process; and
 preventing direct communication between secure containers in the plurality of secure containers.

13. A computer program product for a mobile computing device, the computer program product comprising a non-transitory computer program storage medium comprising instructions that when executed by a processor cause the processor to:
- execute an init process, wherein the init process comprises a container manager and a virtual bridge;
- create, using the container manager, a plurality of secure containers;
- execute, in a first secure container of the plurality of secure containers, a first mobile device process; and
- execute, in a second secure container of the plurality of secure containers, a cluster node process, wherein the cluster node process is configured to operate as a node of a cloud service infrastructure;
- communicatively couple each of the secure containers in the plurality of secure containers with the virtual bridge;
- control communication between pairs of secure containers in the plurality of secure containers based on a pre-determined filter criteria;
- allow communication between at least one of the secure containers in the plurality of secure containers and the init process; and
- prevent direct communication between secure containers in the plurality of secure containers.

* * * * *